United States Patent [19]

Peterson

[11] Patent Number: 4,565,105
[45] Date of Patent: Jan. 21, 1986

[54] POWER TRANSMISSION APPARATUS

[76] Inventor: Walter O. Peterson, 875 Classic Pl., Eugene, Oreg. 97401

[21] Appl. No.: 534,978

[22] Filed: Sep. 23, 1983

[51] Int. Cl.[4] .......................................... F16H 29/08
[52] U.S. Cl. ...................................... 74/119; 74/110; 74/834
[58] Field of Search ................ 74/119, 118, 120, 121, 74/110, 833, 834

[56] References Cited

U.S. PATENT DOCUMENTS

| | | | |
|---|---|---|---|
| 300,734 | 6/1884 | Preston | 74/119 |
| 491,759 | 2/1893 | Prouty | 74/119 |
| 887,785 | 5/1908 | Gauntt | 74/119 |
| 1,401,538 | 12/1921 | Kessler | 74/119 |
| 1,413,114 | 4/1922 | Haustgen | 74/119 |
| 1,431,647 | 10/1922 | Frey | 74/112 |
| 1,508,220 | 9/1924 | Frey | 74/112 |
| 2,254,195 | 8/1941 | Cicin | 74/119 |
| 2,873,611 | 2/1959 | Biermann | 74/119 X |
| 2,935,385 | 5/1980 | Cornelison | 74/119 X |
| 3,224,284 | 12/1965 | McElhenny et al. | 74/119 |
| 3,646,822 | 3/1972 | Pocaterra | 74/53 |
| 3,888,512 | 6/1975 | Peterson | 280/255 |
| 4,109,539 | 8/1978 | Feleus | 74/36 |
| 4,182,203 | 1/1980 | Drury | 74/834 |
| 4,235,130 | 11/1980 | Dulger et al. | 74/834 X |

Primary Examiner—William E. Tapolcai
Attorney, Agent, or Firm—Klarquist, Sparkman, Campbell, Leigh & Whinston

[57] ABSTRACT

A power transmission apparatus includes a housing to which input and output shafts are journalled. The input shaft is rotated by a motor or prime mover to thereby drive a cardioidal-shaped cam. The cam reciprocates a drive rod which has a first end slidably and pivotally connected to one end portion of a plural-section lever. The lever is pivoted to a lever supporting structure for oscillating movement, in response to reciprocations of the drive rod. The lever pivots about a fulcrum pivot axis which is fixed relative to the lever and positioned intermediate the ends of the lever. A first end portion of an output rod is slidably and pivotally connected to the other end portion of the lever. A drive speed adjustment mechanism is provided for shifting the lever supporting structure, and thereby the lever, relative to the input and output loads. As a result of such shifting, the throw or distance through which the output rod reciprocates in response to reciprocations of the input rod is variable in a stepless fashion. In addition, the fulcrum pivot axis is movable into alignment with the first end of the output rod so that, when so positioned, the output rod remains stationary even if the lever is oscillating. Also, an output conversion mechanism is provided for converting reciprocations of the output rod into rotary motion of the output shaft, in either the forward or reverse directions.

9 Claims, 6 Drawing Figures

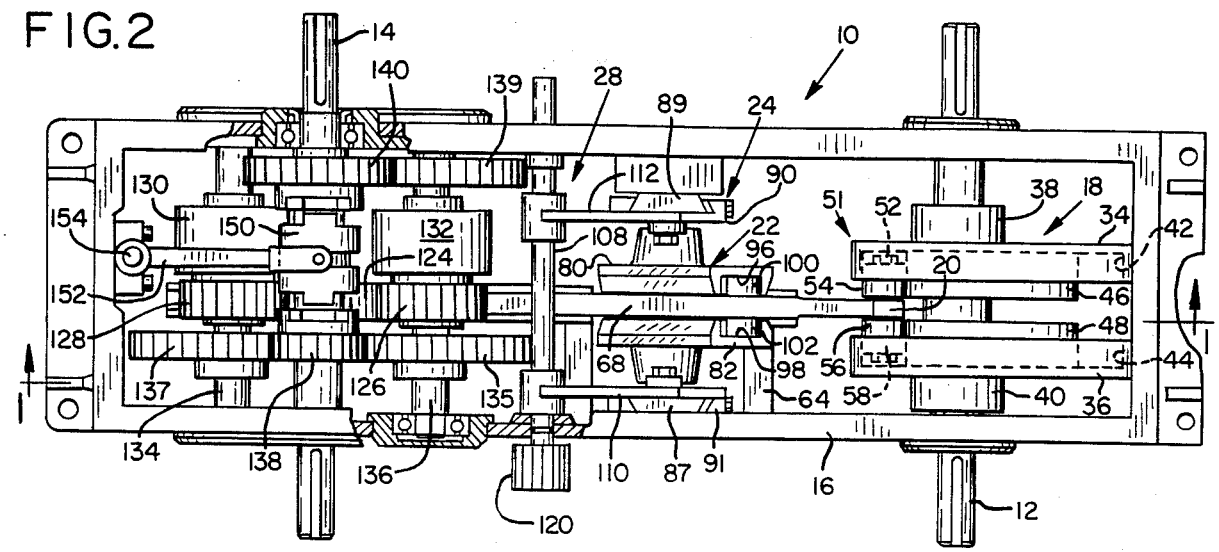
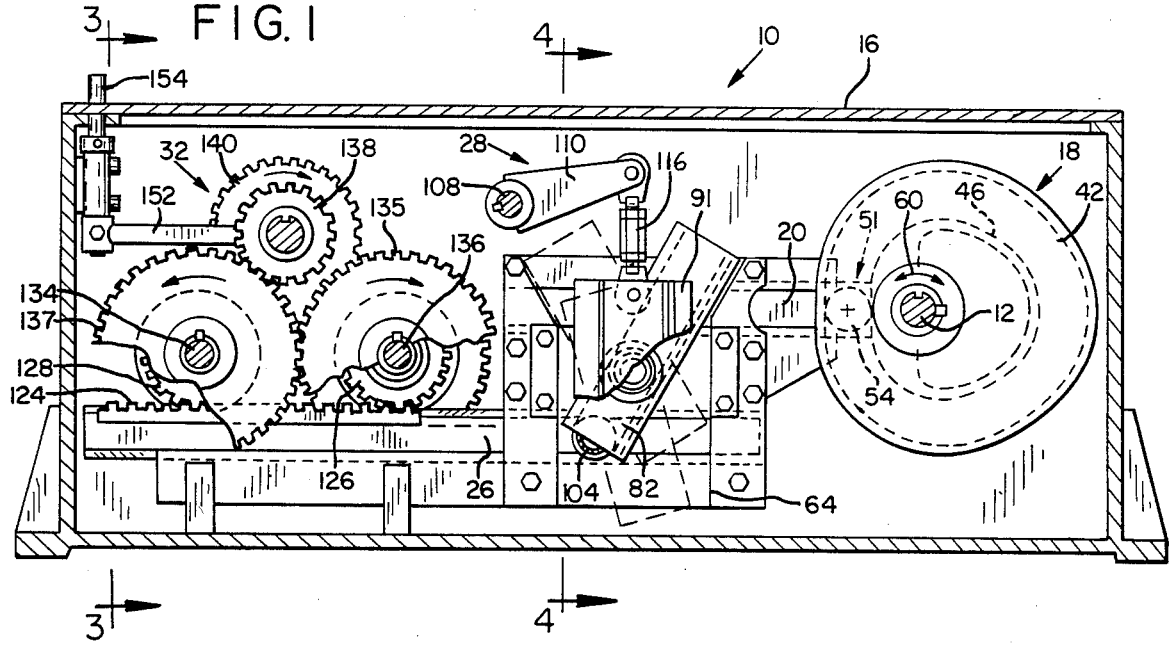
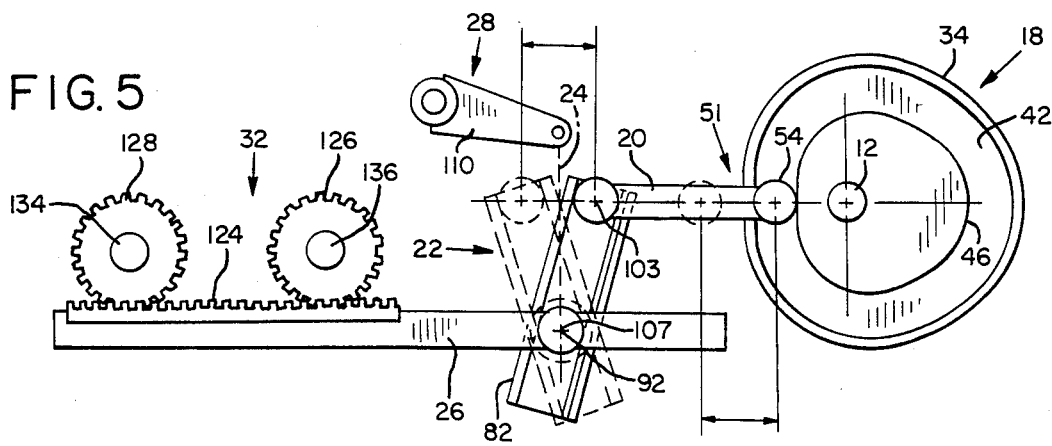

POWER TRANSMISSION APPARATUS

BACKGROUND OF THE INVENTION

1. Field of the Invention

The present invention relates generally to power transmissions and more specifically to continuously variable mechanical power transmissions.

2. Description of the Prior Art

A typical prior mechanical transmission is the sliding gear (standard) transmission. This standard transmission changes the input to output speed ratio, in steps by manually changing gears. Power sources typically operate only over a small speed range with good economy and power. Therefore, a large number of gear changes are required for efficient operation. As an example, some trucks have numerous forward gears.

In addition to the standard transmission, certain stepless mechanical transmissions are also known.

One such device is disclosed in U.S. Pat. No. 1,401,538 of Kessler. In Kessler, a lever is pivoted at one end to a support and at its other end to a drive rod so that reciprocations of the drive rod cause the lever to oscillate. An output rod is provided and is slidably mounted to the lever intermediate its ends. As the lever support is raised and lowered, the lever slides relative to the output shaft. This movement of the support changes the output of the transmission by adjusting the throw of the output shaft arising from oscillations of the lever.

Another prior art transmission device is shown in U.S. Pat. No. 491,759 of Prouty. In Prouty, a drive rod is pivoted to one end of a lever, which is pivoted to a frame. An output rod has one end slidably connected to the lever. As this one end of the output rod is slid closer to and further from the lever pivot, the throw of the output rod is varied. In Prouty, the output rod is coupled to the lever for sliding to locations along the lever from a position aligned with the pivot of the lever for zero output to positions closer to the pivotal connection of the drive rod to the lever.

Still another existing device is shown in U.S. Pat. No. 2,254,195 of Cicin. Cicin includes a drive rod which reciprocates linearly and which is slidably connected to one end of a lever. An output rod has one end pivoted to the other end of the lever. The lever is slidably connected to a pivot and oscillates about this pivot. The pivot is movable from a position aligned with the output rod, in which case the output rod remains stationery as the input rod is driven, to various other positions along the lever. An adjustment mechanism is provided for shifting the pivot along the length of the lever. At the pivot, stresses on the lever are higher. Thus, to withstand certain loads, reinforcement of the lever along its entire length is indicated. This adds to the weight of the lever.

Therefore, although prior art variable transmission devices are known, a need exists for an improved, continuously variable, power transmission.

SUMMARY OF THE INVENTION

In accordance with the invention, a power transmission apparatus is disclosed for transmitting power from a reciprocable drive rod to a reciprocable output rod. This transmission includes a lever support means, a lever means, and a fulcrum means for pivoting the lever means to the lever support means at a fixed location intermediate the end portions of the lever means. One end portion of the lever means is adapted for slidable connection to an end portion of the drive rod while another end portion of said lever means being adapted for slidable connection to an end portion of the output rod. Also, a drive adjustment means is included for shifting the lever support means, and thereby said lever means, relative to the input and output rods to vary the throw of the output rod in response to reciprocations of the drive rod.

As a more specific aspect of the invention, the power transmission apparatus includes a lever to which a fulcrum is fixed. In addition, a means is provided for adjusting the power transmission by moving the entire lever and fulcrum assembly relative to the input and output loads. Such adjustment is permitted because the input and output rods are slidably coupled to respective ends of the lever. In other words, the lever is attached to and supported by the fulcrum so that both the lever and fulcrum are moved to effect different lever moments relative to the load.

As a further aspect of the invention, the output rod is coupled to the lever in a manner which permits the lever and fulcrum assembly to be moved to a position which aligns the axes of the fulcrum and axis about which the output rod pivots relative to the lever. This permits the output rod to remain stationery even as the input rod is driven.

As a further feature of the invention, the lever is formed of first and second lever sections. Each such section is supported by a fulcrum or pivot in spaced apart relationship so that the input and output rods may extend into the space between the lever sections for coupling to the lever sections at locations between the sections. Consequently, the power transmission apparatus is symmetrical about a plane extending through the input and output rods. This minimizes vibrations which would otherwise be produced if the mechanism were not balanced in this manner.

As another feature of the invention, with a fixed fulcrum and lever assembly, the lever may be reinforced to provide its greatest strength at or near the fulcrum, the point of highest stress on the lever. This permits an overall reduction in the weight of the lever and allows the lever to oscillate at higher operating speeds.

As a still further aspect of the invention, a cardioidal constant-motion cam mechanism is provide for driving the input or drive rod to reciprocate the lever about the fulcrum.

As another feature of the invention, multiple assemblies of cams, input rods, output rods, and levers may be provided and coupled to a common output shaft, the cams being set out of phase from one another to provide a smoother power output from the transmission.

As a still further aspect of the invention, an output utilization means is provided for converting the reciprocations of the output rod into rotations of an output shaft.

As a specific illustrated embodiment of the output mechanism, plural, one-way clutches with a rack and pinion mechanism is provided to convert reciprocations of the output rod into rotary motion of an output shaft.

It is accordingly one object of the invention to provide an improved power transmission apparatus.

Another object of the invention is to provide a power transmission apparatus capable of operating over a wide range of stepless speed changes.

It is still another object of the invention to provide a power transmission which converts rotations of an input shaft to rotation of an output shaft, with the ratio of the revolutions per minute (rpm) of the output shaft to input shaft being variable over a wide range of from zero to one or more.

Another object of the invention is to provide a power transmission apparatus capable of providing a zero output to input rpm ratio without requiring a declutching device.

A still further object of the invention is to provide a power transmission apparatus of a design in which the vibrations of the apparatus are minimized.

Still another object of the invention is to provide an apparatus which is capable of operating at relatively high speeds.

A further object of the invention is to provide a relatively efficient, reliable, compact and rugged power transmission apparatus.

Still another object of the invention is to provide a power transmission apparatus which is capable of providing a high torque output at a low output rpm, especially where input power is limited.

A still another object of the invention is to provide a power transmission apparatus which provides a smooth power delivery.

These and other objects, features, and advantages of the invention will become apparent with reference to the following description and drawings.

BRIEF DESCRIPTION OF THE DRAWINGS

In the drawings:

FIG. 1 comprises a vertical sectional view of a power transmission in accordance with the invention, taken along line 1—1 of FIG. 2;

FIG. 2 is a partially broken away top plan view of a power transmission in accordance with the invention;

FIG. 5 is a schematic view of a power transmission apparatus in accordance with the invention, with the lever and fulcrum assembly shown in one position.

DETAILED DESCRIPTION OF THE PREFERRED EMBODIMENT

Figure 6:
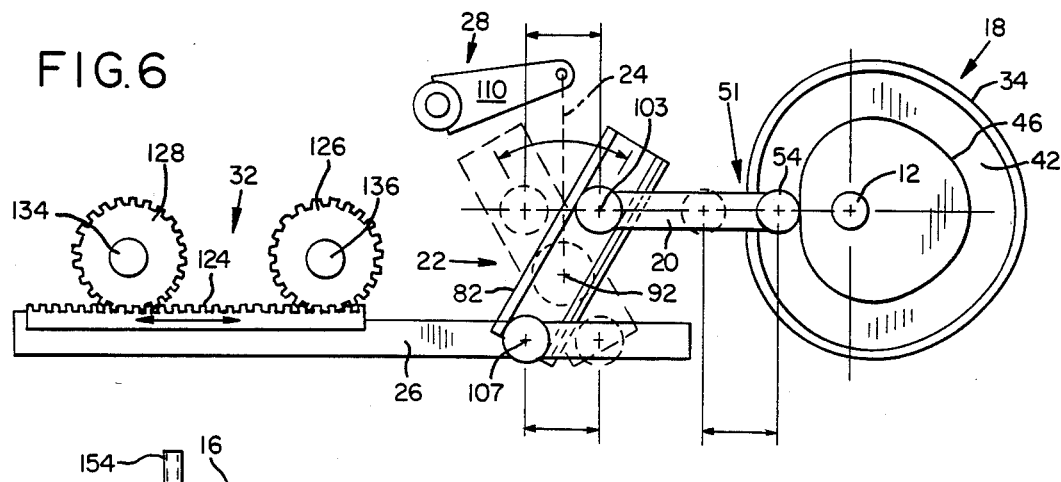
FIG. 6 is a schematic view of a power transmission apparatus in accordance with the invention, with the lever and fulcrum assembly shown in another position from that shown in FIG. 5.

With reference to FIGS. 1 and 2, a power transmission apparatus 10 in accordance with the invention is illustrated for transmitting power from a rotatable input shaft 12 to a rotatable output shaft 14. As explained below, the transmission is capable of continuously varying the speed of rotation of the output shaft 14 from zero to speeds at or above the speed of rotation of the input shaft. In addition, the shaft 14 is rotatable by the transmission in both forward and reverse directions.

In general, the apparatus is contained within a housing 16 to which the input and output shafts 12, 14 are journalled. Input shaft 12 is adapted to be rotated by a motor or prime mover (not shown) to thereby drive a cam mechanism 18. The cam mechanism in turn reciprocates a drive rod 20. A first end portion of rod 20 is slidably and pivotally connected to one end portion of a lever of a lever assembly 22. The lever assembly is pivoted to a lever supporting structure 24 for oscillating movement, in response to reciprocations of drive rod 20, about a fulcrum pivot axis which is fixed relative to the lever. A first end portion of an output rod 26 is slidably and pivotally connected to the other end portion of the lever. A drive speed adjustment 28 is provided for shifting the lever supporting structure 24 and thereby the lever 22 relative to the input and output loads. That is, adjustment 28 is capable of continuously varying the distance from the fulcrum pivot axis to the first end of drive rod 20 relative to the distance from the fulcrum pivot axis to the first end of output rod 26. As a result of such shifting, the throw or distance through which the output rod 26 reciprocates in response to reciprocations of the input rod 20 is variable in a stepless fashion. Furthermore, the apparatus is designed so that the fulcrum pivot axis is movable into alignment with the first end of output rod 26. When so positioned, the output rod remains stationary, even if the lever is oscillating. Also, an output conversion mechanism 32 is provided for converting the reciprocating motion of the output rod 26 into rotary motion of the output shaft 14, in either the forward or reverse directions.

Thus, the power transmission apparatus of the invention comprises a means for continuously varying the speed of an output shaft, in response to rotations of an input or drive shaft over a wide range from zero to higher levels. In addition, this is accomplished with a lever which is fixed to a fulcrum, and adjusting the fulcrum lever assembly relative to input and output loads to accomplish the power transmission.

Cam mechanism 18 includes a pair of laterally spaced apart, generally cardioidal-shaped cam sections 34, 36 mounted to the shaft 12. Respective collars 38, 40 reinforce the cam sections 34, 36 where they are coupled to the shaft. The adjacent or facing surfaces of the cam sections 34, 36 are recessed to provide respective cam follower receiving slots 42, 44. Raised tracks 46, 48 are provided along the interior perimeters of the slots 42, 44 and project outwardly from the adjacent cam surfaces. A cam follower assembly 51 is mounted to the end of drive rod 20 adjacent the cam mechanism 18. In the illustrated embodiment, this cam follower includes rollers 52, 54, 56, and 58 pivoted to this end of drive rod 20. More specifically, rollers 52, 54 are positioned along one side of rod 20 with roller 52 being disposed within and guided by the slot 42 and roller 54 positioned to travel along the raised track 46. In the same manner, rollers 56, 58 are positioned at the opposite side of the rod 20 from rollers 52, 54, with roller 58 being positioned in slot 44 and roller 56 engaging the track 48. As best seen in FIG. 1, recess 42 of track 46 is of a generally cardioidal shape so that the cam follower 51 achieves a smooth change in direction as the shaft 12 and cam sections rotate. Thus, the cam mechanism converts the rotary motion of shaft 12 into a reciprocating, push-pull, motion of the drive rod 20.

Although not shown, additional cam assemblies may be provided for a smoother output from the transmission. These additional cam assemblies would be set out of phase to the illustrated cam assembly. Also, as indicated by arrow 60, shaft 12 may be rotated in either direction without effecting the operation of the transmission.

In addition, because of the symmetry of the cam assembly 18, with drive rod 20 being positioned in the plane bisecting the cam assembly, undesirable vibrations are minimized.

Figure 4:
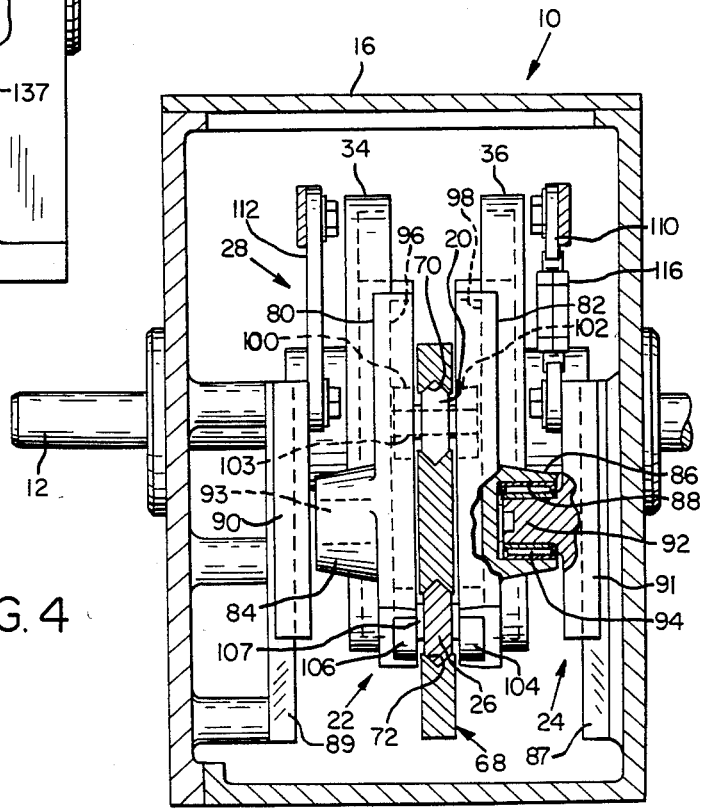
FIG. 4 is a cross-sectional view of the power transmission apparatus taken along line 4—4 of FIG. 1.

In the illustrated embodiment, both the drive rod 20 and output rod 26 are constrained to reciprocate linearly. Furthermore, these rods 20, 26 move in lines parallel to one another. In the figures, for convenience in illustration and description, the rods 20, 26 are shown in a common vertical plane. Incidentally, the references in the description to vertical, horizontal, up and down are not to be construed as limitations, as the transmission is capable of functioning in any orientation. A frame 64 mounted to the housing supports the rods 20, 26 for this linear movement. As best seen in FIGS. 1 and 4, this frame includes a central plate 68, which may be of multiple sections. Plate 68 is provided with a horizontally extending slot 70 (FIG. 4) which receives the drive rod 20 and a lower horizontally extending slot 72 which receives output rod 26. V-shaped notches are provided at the upper and lower boundaries of the respective slots 70, 72. The rods 20, 26 have corresponding V-shaped projections so that the rods are retained within the slots.

With continued reference to FIG. 4, the lever assembly 22 includes first and second lever sections 80, 82 which are spaced apart and disposed on opposite sides of the plate 68 from one another. The lever sections are supported by the lever supporting structure 24 in the following manner. The support structure for lever section 82 comprises a mounting bracket 91 which is slidably mounted to a side wall portion or bracket 87 of the housing 16. Mounting bracket 91 is free to slide upwardly and downwardly along the side wall portion 87. As shown in FIG. 2, side wall bracket 87 flares outwardly while mounting bracket 91 is provided with an inwardly flared recess such that these two elements cooperatively engage one another. As a result, lever mounting bracket 91 is retained on the side wall bracket 87 with vertical motion of the mounting bracket being permitted. A fulcrum pin portion 92 projects outwardly from lever mounting bracket 91 toward lever section 82. Lever section 82 is provided with a collar 86 having an annular recess 88 for receiving the fulcrum pin 92. A bearing 94 rotatably couples collar 86 to pin 92. As can be seen in FIG. 4, collar 86, and thus the fulcrum pin, is intermediate the ends of the lever section 82. As a result, movement of lever mounting bracket 91 upwardly or downwardly causes a corresponding movement of lever section 82.

Lever section 80 is a mirror image of lever section 82, having a collar 84 pivoted to a fulcrum 93 of a lever supporting bracket 90, which in turn is slidably mounted to another side wall bracket 89.

End portions of drive rod 20 and output rod 26 are pivotally and slidably connected to the lever sections 80, 82 as follows. A longitudinal recess 96 is provided in the surface of lever section 80 adjacent to the plate 68. A similar recess 98 is provided in the surface of lever 82 adjacent to this plate. A pin 103 extends through an end portion of drive rod 20. This pin pivotally supports a roller 100 positioned within the slot 96 and another roller 102 positioned within the slot 98. Consequently, reciprocation of the drive rod 20, in response to rotation of the drive shaft 12, causes the lever to oscillate about a fulcrum pivot axis through the fulcrum pin portions 92, 93. A pin 107 also extends through an end portion of the output rod 26. A roller 104 is pivoted to this pin and positioned within the slot 98 while a similar roller 106 is pivoted to the pin and positioned within the slot 96.

Whenever the fulcum pivot axis is not coincident or aligned with the axis of pin 107, any oscillation of the lever section causes a reciprocation of the output rod 26. On the other hand, when the fulcrum axis is aligned with the axis of pin 107, the output rod remains stationary even though the lever sections 80, 82 are oscillating. Also, with a lever with a fixed fulcrum, it is possible to reinforce the lever at or near the fulcrum, where the lever is subject to high stress. This is accomplished by the reinforcing collars 84, 86. Because reinforcement of the entire lever is not required to withstand the higher stresses at the fulcrum location, the overall weight of the lever may be reduced. Also, because the mass of the lever is concentrated at the fulcrum, and not at the ends of the lever, the lever is capable of operating at higher oscillating speeds. In addition, because the lever is designed with equal mass on each side of the drive and output rods, undesirable vibrations are minimized.

A drive adjustment mechanism is provided for adjusting the distance between the fulcrum pivot axis and the axis of pin 103 relative to the distance between the fulcrum pivot axis and the axis of pin 107. Such drive adjustment varies the throw of the output shaft 26 in response to reciprocations of the drive shaft 20. Furthermore, this means for adjusting the distance is capable of bringing the fulcrum pivot axis into alignment with the pin 107. When so aligned, the output rod 26 is stationary, as is the output shaft 14.

One form of this drive adjustment means includes a shaft 108 journalled to the housing 16. Arms 110, 112 project outwardly from, and are keyed or otherwise fastened to, shaft 108. Thus, any pivoting of shaft 108 produces a corresponding pivoting of arms 110, 112. These arms are positioned in approximately the same plane as the respective lever supporting brackets 91, 90. A link 116 (FIG. 4) is pivoted at one end to arm 110 and at its other end to lever supporting bracket 91. A similar link is pivoted at one end to arm 112 and at its other end to the lever supporting bracket 90. Rotation of rod 108 in one direction shifts the lever supporting brackets 90, 91 and lever sections 80, 82 upwardly in FIG. 4, while rotation of the shaft in the other direction produces a downward movement of the lever sections. As mentioned above, the respective rods 20, 26 are slidably engaged by the lever sections. As a result, shifting of the lever sections adjusts the distance between the fulcrum pivot axis and the instantaneous location of the drive rod on the lever section relative to the distance from the fulcrum pivot axis to the instantaneous location of the output rod on the lever section. This varies the throw of the output rod due to reciprocations of the input rod. Shaft 80 may be rotated manually, utilizing a knob 120, or by a small motor. A mechanism (not shown) is provided for retaining the shaft 108 in one position until it is moved to another position.

Figure 3:
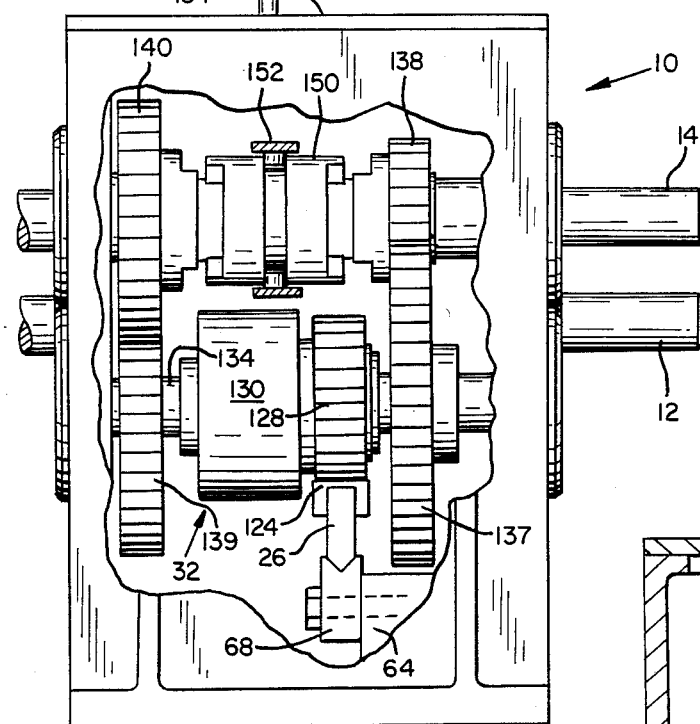
FIG. 3 is an end view of the power transmission taken along line 3—3 of FIG. 1.

Although any suitable mechanism may be utilized for translating reciprocations of the output rod 26 into rotary motion of output shaft 14, an exemplary output utilizing means 32 is illustrated. In this mechanism, a rack 124 (FIGS. 1, 2, and 3) is mounted to the upper surface of output rod 26. Rack 124 engages gears 126 and 128 which in turn drive ratchets or one-way clutches 130, 132 respectively. When the power transmission apparatus is in forward, as explained below, as rack 124 reciprocates to the right in FIG. 1, gear 128 is driven in a counterclockwise direction. When moving in this direction, a one-way clutch 130 coupled to gear 128 causes shaft 134 to be driven in rotation. Shaft 134 carries a gear 137 which engages a gear 138 on output shaft 14. Consequently, when shaft 134 is rotated, the gears 137, 138 in turn rotate output shaft 14 in the forward direction. At the same time, one-way clutch 132 disengages the the shaft 136 from gear 126 so that this shaft is not driven. In contrast, as rack 124 moves to the left in FIG. 1, clutch 130 disengages gear 128 from shaft 134. However, gear 126 is engaged with shaft 136 so that this shaft is driven in a clockwise direction. A gear 135 on shaft 136 meshes with gear 137 on shaft 134 so that as shaft 136 is driven, gear 137 drives gear 138 and output shaft 14 is again rotated in the forward direction. When the power transmission apparatus is in reverse, as explained below, as shaft 136 is driven, a gear 139 on this shaft drives a gear 140 on output shaft 14 to drive the output shaft in the reverse direction.

A forward to reverse shifting mechanism is provided for shifting the power transmission from forward to reverse modes and vice versa. This shifting mechanism includes a clutch 150 shiftable along shaft 14. In FIG. 2, clutch mechanism 150 is shown in a neutral position. When shifted downwardly along shaft 14 in FIG. 2, clutch 150 couples the forward gear 138 to the shaft 14 so that the shaft is driven in the forward direction as the output rod 26 reciprocates. Conversely, when shifted upwardly along shaft 14 in FIG. 2, the clutch 150 couples the reverse gear 140 to shaft 14 so that the shaft 14 is driven in the reverse direction as the output rod reciprocates. An arm 152 has one end rotatably coupled to the clutch 150 (see FIG. 3) and has its other end connected to an upright stick shift 154. Pivoting of the stick 154 causes arm 152 to pivot and slide clutch 150 into and out of engagement with forward and reverse gears 138, 140.

The operation of the power transmission apparatus is best understood with reference to the schematic diagrams of the apparatus shown in FIGS. 5 and 6. As the cam section 34 rotates, cam follower 51 converts this rotary motion to a push-pull or reciprocating motion of the drive rod 20. As the drive rod 20 reciprocates, the lever assembly 22 oscillates about the fulcrum pivot axis extending through pin 92. In addition, the end portion of the drive rod 20 coupled to the lever section slides and pivots relative to the lever section as this oscillation takes place. Relative pivoting occurs between the lever section and drive rod 20 about the axis of pin 103. In addition, the end portion of output rod 26 coupled to the lever section is capable of sliding and pivoting relative to the lever section. Relative pivoting occurs between the lever section and output rod about the axis of pin 107. With the fulcrum pivot axis shifted by drive speed adjustment mechanism 28 to the position shown in FIG. 5, the axis of pin 107 is aligned with the fulcrum pivot axis. Consequently, as the lever section 82 is oscillated by the drive rod 20, output rod 26 remains stationary. This results in a zero rpm output at output shaft 14.

The drive speed adjustment mechanism 28 adjusts the relative distance between the fulcrum pivot axis and the respective end portions of the shafts coupled to the lever section. Specifically, as arm 110 moves upwardly, the fulcrum pivot axis moves away from the axis of pin 107 and toward the axis of pin 103. As a result, output rod 26 begins to reciprocate (as shown in FIG. 6) and drive the gears 126, 128 to in turn drive the output shaft 14 as previously explained. When the fulcrum pivot axis is shifted into alignment with the axis of pin 103, a one-to-one correspondence is provided between reciprocations of the drive rod 20 and reciprocations of the output rod 26.

Thus, the power transmission apparatus is provided with the capacity of continuously varying the output speed of an output shaft over a wide range from zero rpm to higher levels. This apparatus is further capable of providing high output torque at low output speeds of the output shaft. Also, higher and smaller output power delivery is obtainable by coupling multiple cams and cam driven levers to a common output shaft.

Having illustrated and described the principles of my invention with reference to one preferred embodiment, it should be apparent to those persons skilled in the art that such invention may be modified in arrangement and detail without departing from such principles. I claim as my invention all such modifications as come within the true spirit and scope of the following claims.

I claim:

1. A power transmission apparatus comprising:

lever support means;

lever means having first and second end portions;

fulcrum means for pivoting said lever means to said lever support means at a fixed pivot location intermediate the first and second end portions of said lever means;

drive rod means adapted to be driven in reciprocation, said drive rod means having one end portion slidably and pivotally coupled to the first end portion of said lever means for sliding and pivoting relative to said lever means as said drive rod means reciprocates;

drive rod guide means for guiding the motion of said drive rod means so as to impart oscillating movement to said lever means as said drive rod means reciprocates;

output rod means having one end portion slidably and pivotally coupled to the second end portion of said lever means;

drive adjustment means for selectively shifting said lever support means to vary the distance from the pivot location to said one end portion of said drive rod means relative to the distance from the pivot location to said one end portion of said output rod means;

output rod guide means for guiding the movement of said output rod means so as to reciprocate in response to oscillating movement of said lever means whenever there is a non-zero distance from said pivot location to said one end portion of said output rod means; and whereby shifting of said lever support means varies the distance through which said output rod means reciprocates in response to reciprocation of said drive rod means;

said lever means including first and second spaced apart lever portions, said lever portions each having first and second side walls with the second side walls being positioned adjacent to one another, said lever portions each having a longitudinally extending, outwardly opening, slot;

means for supporting said drive rod means to position said one end portion thereof between said lever portions;

means for supporting said output rod means to position said one end portion thereof between said lever portions; said one end portion of said drive rod means including first coupling means slidably positioned within the slots of said lever portions and pivoted relative to said lever portions to slidably and pivotally couple said one end portion of said drive shaft means to said lever portions; and said one end portion of said output rod means including second coupling means slidably positioned within the slots of said lever portions and pivoted relative to said lever portions to slidably and pivotally couple said one end portion of said output rod means to said lever portions.

2. A power transmission apparatus according to claim 1 in which said first coupling means comprises a first set of at least two roller means pivoted to said one end portion of said drive rod means, one roller means of the first set being positioned within the slot of one of said lever portions and another roller means of the first set being positioned within the slot of the other of said lever portions; and in which said second coupling means comprises a second set of at least two roller means pivoted to said one end portion of said output rod means, one roller means of the second set being positioned within the slot of one of said lever portions and another roller means of the second set being positioned within the slot of the other of said lever portions.

3. A power transmission apparatus according to claim 2 in which said first lever portion includes a first collar means projecting outwardly from the first side wall thereof at the pivot location and said second lever portion includes a second collar means projecting outwardly from the first side wall thereof;

said lever support means including a first lever supporting bracket having a first outwardly projecting fulcrum pin means which is positioned within an opening of the first collar to pivotally support the first collar and thereby the first lever portion;

said lever support means also including a second lever supporting bracket having a second outwardly projecting fulcrum pin means which is positioned within an opening of the second collar to pivotally support the second collar and thereby the second lever portion.

4. A power transmission apparatus according to claim 3 including a housing, said first and second lever supporting brackets being slidably mounted to said housing for movement in directions which vary the distance from the pivot location to said one end portion of said drive rod means relative to the distance from the pivot location to said one end portion of said output rod means; and said drive adjustment means comprising means for moving said lever supporting brackets.

5. A power transmission apparatus according to claim 3 in which said drive rod guide means comprises means for constraining said drive rod means for reciprocation in a first line, and said output rod guide means comprises means for constraining said output rod means for reciprocation in a second line parallel to the first line;

said apparatus including a housing, said first and second lever supporting brackets being slidably mounted to said housing for movement in a direction normal to the first and second lines;

said drive adjustment means comprising means for sliding said first and second lever supporting brackets.

6. A power transmission apparatus according to claim 5 in which said drive adjustment means comprises a rod pivoted to said housing, first and second arms mounted to said rod, a first link pivoted to said first arm and to said first lever supporting bracket, a second link pivoted to said second arm and to said second lever supporting bracket, and means for pivoting said rod to move said first and second lever supporting brackets and thereby said first and second lever portions to vary the distance from the pivot location to said one end portion of said drive rod means relative to the distance from the pivot location to said one end portion of said output rod means.

7. A power transmission apparatus according to claim 6 including a drive shaft rotatably mounted to said housing and adapted to be driven in rotation, cardioidal cam means mounted to said drive shaft means, cam follower means for coupling said drive rod means to said cam means such that rotation of said drive shaft reciprocates said drive rod means.

8. A power transmission apparatus according to claim 7 in which said cam means comprises first and second spaced apart cam sections having first walls adjacent to one another, each of said first walls including a cardioidal shaped channel and a cardioidal track projecting from the first wall along the interior boundary of the cardioidal channel, said cam follower means comprising roller means pivoted to the end portion of said drive rod means opposite to said one end portion, said roller means including a first roller positioned within the channel of the first cam section, a second roller positioned within the channel of the second cam section, a third roller riding on the track of the first cam section, and a fourth roller riding on the track of the second cam section.

9. A power transmission apparatus according to claim 8 including output shaft means rotatably mounted to said housing and means coupling said output shaft to said output rod means for connecting reciprocations of said output rod means into rotational movement of said output shaft.

* * * * *